(12) United States Patent
Brodie et al.

(10) Patent No.: US 6,208,269 B1
(45) Date of Patent: Mar. 27, 2001

(54) AUTOMATICALLY ACTIVATED RESCUE RADIO AND ASSOCIATED METHOD

(75) Inventors: Keith J. Brodie, Irvine; Stephen C. DeGuire, Rancho Santa Margarita, both of CA (US); Craig W. O'Grady, Grand Junction, CO (US); Roger L. Corey, Alta Loma, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/474,978

(22) Filed: Dec. 29, 1999

(51) Int. Cl.[7] .................................................. G08B 21/00
(52) U.S. Cl. ................................ 340/945; 244/122 AE; 455/404
(58) Field of Search ................................ 340/963, 945, 340/971, 981; 701/3, 9, 14, 213; 342/357; 455/404, 98; 320/127; 244/122 A, 122 AE

(56) References Cited

U.S. PATENT DOCUMENTS

| | | |
|---|---|---|
| 4,087,802 | 5/1978 | Williamson . |
| 4,215,342 | 7/1980 | Horowitz ............................. 340/572 |
| 4,970,518 | 11/1990 | Cole, Jr. ................................. 342/37 |
| 5,289,163 | 2/1994 | Perez et al. .......................... 340/539 |
| 5,357,254 | 10/1994 | Kah, Jr. ................................ 340/539 |
| 5,587,704 | 12/1996 | Foster .................................. 340/539 |
| 5,626,531 | 5/1997 | Little ................................... 473/353 |
| 5,686,902 | 11/1997 | Reis et al. ............................ 342/457 |
| 5,721,535 | 2/1998 | Ikefuji ................................... 342/42 |
| 5,734,326 | 3/1998 | Skudera, Jr. ......................... 340/572 |
| 5,748,087 | 5/1998 | Ingargiola et al. .................... 340/539 |
| 5,808,550 | 9/1998 | Raimbault et al. ................... 340/693 |
| 5,894,285 | * 4/1999 | Yee et al. ............................. 342/357 |
| 6,037,748 | * 3/2000 | Yee et al. ............................. 320/127 |

OTHER PUBLICATIONS

The Boeing Company; Personal Locator Beacon/Voice Transceiver (PLBVT) and Dual Frequency Emergency Locator Transmitter (ELT); T97–300/201; Nov. 12, 1997; Cover Page, Table of Content Page and p. 31; vol. 1—Technical; The Boeing Company, Communication & Information Management Systems Division, Anaheim, California 92803–4921.

* cited by examiner

*Primary Examiner*—Brent A. Swarthout
(74) *Attorney, Agent, or Firm*—Alston & Bird LLP

(57) ABSTRACT

A rescue radio system includes a radio frequency tag, which is carried by and remains with an aircraft, and a rescue radio, which is carried by and remains with an aircrew member. The rescue radio includes an accelerometer that generates an actuation signal in response to the rescue radio being accelerated at a rate that is at least as great as the minimum amount of acceleration that the rescue radio can experience while the rescue radio is being carried by an aircrew member who is ejected from the aircraft. In response to the actuation signal, an interrogator of the rescue radio is activated so that it transmits an interrogatory signal. The radio frequency tag emits a reply signal in response to receiving the interrogatory signal. The interrogator receives the reply signal if the rescue radio is proximate to the radio frequency tag. The rescue radio includes a controller that causes a beacon transmitter of the rescue radio to transmit a beacon signal when the interrogator is activated and does not receive the reply signal, so that the beacon signal is transmitted when the rescue radio has been ejected from the aircraft. The controller also prevents the beacon transmitter from transmitting the beacon signal when the interrogator is activated and does receive the reply signal, so that the beacon signal is not transmitted when the rescue radio has not been ejected from the cockpit.

19 Claims, 4 Drawing Sheets

AUTOMATICALLY ACTIVATED RESCUE RADIO AND ASSOCIATED METHOD

FIELD OF THE INVENTION

The present invention relates generally to automatically activated radios and, more particularly, to a rescue radio that is carried by an aircrew member and is automatically activated in response to the aircrew member being ejected from an aircraft.

BACKGROUND OF THE INVENTION

Some aircraft, such as aircraft used in combat, are equipped with one or more ejection seats. While an aircraft with an ejection seat is in use, the aircrew member operating the aircraft is strapped to the ejection seat with seatbelts. In some emergency situations in which the aircraft becomes inoperative, the ejection seat, together with the aircrew member strapped thereto, is ejected from the aircraft so that the aircrew member can parachute to the ground.

It is conventional for an ejection seat to carry an emergency locator transmitter (ELT) that is automatically activated when the ejection seat is ejected from the aircraft. Once activated, the ELT transmits a beacon signal, which can be characterized as providing both an indication of the ejection and the location of the ejection seat.

The ELT is typically releasably tethered to the aircraft. More specifically, the ELT is activated by a lanyard having one end connected to the aircraft and an opposite end that pulls a mechanical or magnetic activation pin away from the ELT upon ejection, so that the ELT is automatically activated. It is important for the ELT to be automatically actuated, because in some circumstances the associated aircrew member will be disabled and unable to activate their primary handheld rescue radio, which is typically carried in the aircrew member's vest pocket. In addition to transmitting a beacon signal, a primary handheld rescue radio can provide for two-way verbal communication.

Aircrew members that eject from aircraft are often not disabled. An aircrew member that has parachuted to the ground with their ejection seat can remove the ELT from the ejection seat and extend an antenna to increase the effectiveness of the ELT. Nonetheless, it is common for an aircrew member that has parachuted to the ground to turn off the ELT and turn on their primary handheld rescue radio.

Whereas having both an ELT and a primary handheld rescue radio for each aircrew member ensures that a beacon signal is automatically transmitted when an aircrew member is ejected and provides the aircrew member with a handheld rescue radio, providing both of those radios may not be cost effective in some situations. In addition to the cost of the two separate radios, costs are also incurred in maintaining and servicing the two radios.

SUMMARY OF THE INVENTION

The present invention solves the above problems, and other problems, by providing a rescue radio that can be carried by an aircrew member and, in accordance with one method of the present invention, automatically activates in response to the aircrew member being ejected from their aircraft, without requiring that the rescue radio be mechanically tethered to the aircraft. In accordance with one aspect of the present invention, the rescue radio is sized to be handheld and is removably secured in the vest pocket of an aircrew member who is strapped to the ejection seat of an aircraft. The rescue radio automatically begins transmitting a beacon signal when the aircrew member is ejected. More specifically, the rescue radio is a part of a rescue radio system that includes a transceiver, or the like, such as a passive radio frequency tag, that is carried by and remains with the aircraft. In response to the rescue radio being accelerated because of being ejected or because of an extreme aircraft maneuver, the rescue radio interrogates the radio frequency tag. It is determined through the interrogation whether the rescue radio is within the cockpit of the aircraft. If the interrogation indicates that the rescue radio is not in the cockpit, then the beacon signal is transmitted. If the interrogation indicates that the rescue radio is in the cockpit, then the beacon signal is not transmitted.

In accordance with an embodiment of the present invention, the rescue radio includes an accelerometer that generates an actuation signal in response to the rescue radio being accelerated at a rate that is at least as great as a predetermined value. The predetermined value is preferably the minimum amount of acceleration that the rescue radio can experience while the rescue radio is being carried by an aircrew member who is ejected from the aircraft via the ejection seat. The rescue radio also includes an interrogator that transmits an interrogatory signal that activates the radio frequency tag. The radio frequency tag emits a reply signal in response to receiving the interrogatory signal. The interrogator can receive the reply signal that is emitted from the radio frequency tag, but the interrogator does not receive the reply signal unless the rescue radio is proximate to the radio frequency tag, such as by being in a cockpit with the radio frequency tag. The rescue radio also includes a beacon transmitter that transmits the beacon signal.

The rescue radio also includes a controller that activates the interrogator so that the interrogator transmits the interrogatory signal in response to the actuation signal being generated by the accelerometer. The controller also causes the beacon transmitter to transmit the beacon signal when the interrogator is activated and does not receive the reply signal, so that the beacon signal is transmitted when the rescue radio has been ejected from the aircraft. The controller also prevents the beacon transmitter from transmitting the beacon signal when the interrogator is activated and does receive the reply signal, so that the beacon signal is not transmitted when the rescue radio has not been ejected from the aircraft.

In accordance with another aspect of the present invention, the controller causes the interrogator to transmit the interrogatory signal at a predetermined time after the actuation signal is generated by the accelerometer. The predetermined time is at least as great as the amount of time which it takes for the ejection seat to be fully ejected from the cockpit of the aircraft.

The rescue radio of the present invention is preferably handheld, automatically transmits the beacon signal without being mechanically tethered to the aircraft, and also preferably provides for two-way verbal communication. The rescue radio of the present invention may be used in place of a traditional primary handheld rescue radio, in which case it is not necessary for two separate rescue radios (that is, an emergency locator transmitter mounted to the ejection seat and the handheld rescue radio) to be provided for each aircrew member. Thus, the present invention can allow for a reduction in the number of rescue radios provided for each aircrew member, which is advantageous. In addition, the radio frequency tag of the rescue radio system of the present invention is small and inexpensive in comparison to a rescue radio. Moreover, the operations of several rescue radios of the present invention that are contemporaneously used in the same aircraft can be coordinated so that the several rescue radios can operate in conjunction with a single radio frequency tag.

Notwithstanding that the present invention provides for a reduction in the number of rescue radios that are required for each aircrew member, if the rescue radio of the present invention is used in conjunction with an emergency locator transmitter mounted to an ejection seat, then the rescue radio of the present invention will provide redundancy in the automatic transmission of a beacon signal, which may be advantageous in some circumstances.

Whereas the rescue radio system of the present invention utilizes an accelerometer to identify accelerations that may be indicative of an ejection, it is possible that such use of an accelerometer alone may falsely identify an ejection, particularly in combat aircraft that are capable of maneuvering in a manner that results in high acceleration forces. The interrogator of the rescue radio of the present invention advantageously interrogates the radio frequency tag that is mounted within the cockpit to ensure that the beacon signal is transmitted only in response to an actual ejection. As mentioned above, the interrogator is activated when the accelerometer identifies an acceleration that may be indicative of an ejection. Thereafter, the interrogator cooperates with the radio frequency tag to determine if the aircrew member has been ejected from the cockpit, or more particularly to determine if the rescue radio is proximate to the radio frequency tag mounted within the cockpit. If the rescue radio is not proximate to the radio frequency tag, the beacon signal is transmitted. If the rescue radio is proximate to the radio frequency tag, the beacon signal is not transmitted and the interrogator is deactivated. As a result, the beacon signal is advantageously transmitted only when an actual ejection has occurred. In accordance with the present invention, consumption of electrical energy is advantageously minimized since the interrogator is activated only when the rescue radio has experienced an acceleration that may be indicative of an ejection. Further, the accelerometer draws only a few microamps while waiting for large accelerations, and the radio frequency tag is passive such that it is not directly powered by a source of electrical energy. As a result, another advantage of the rescue radio system of the present invention is that it consumes a minimal amount of electrical energy.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will filly convey the scope of the invention to those skilled in the art. Like numbers refer to like elements throughout.

Figure 1:
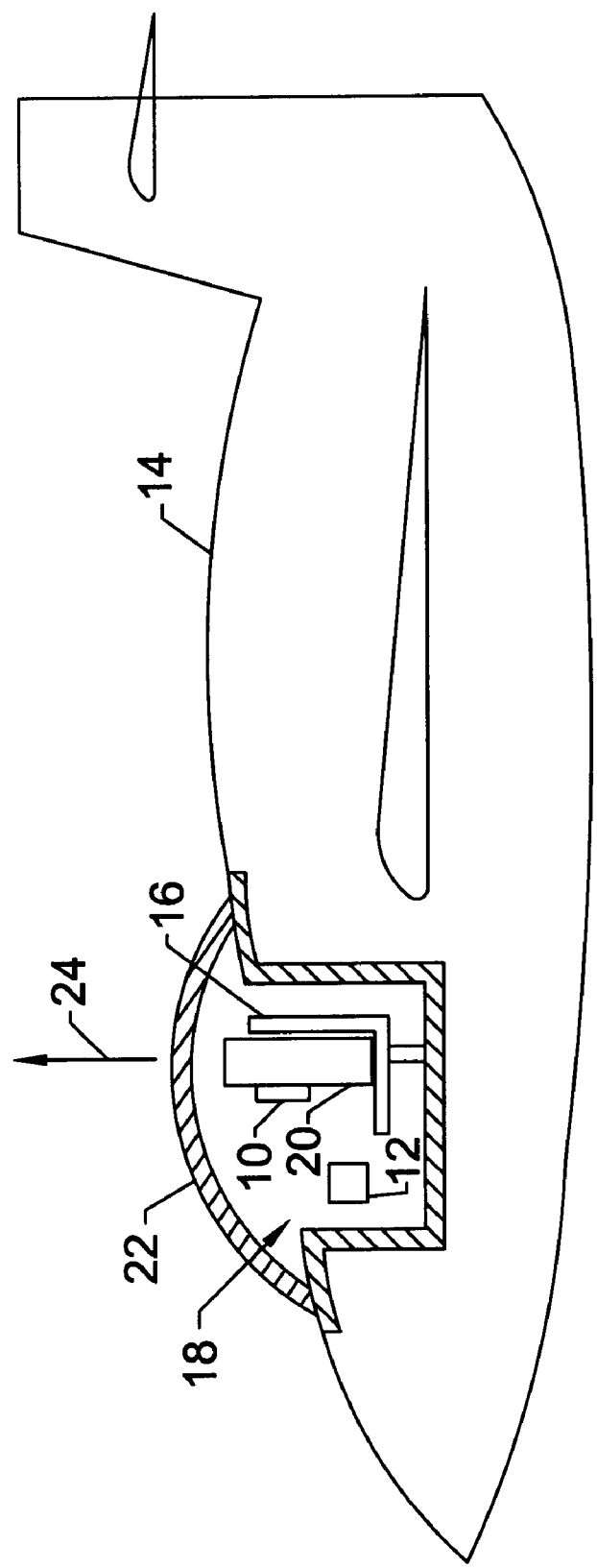
FIG. 1 is a diagrammatic, side, partially cross-sectioned view of an aircraft incorporating a rescue radio system, in accordance with an embodiment of the present invention.

FIG. 1 diagrammatically illustrates a rescue radio system positioned within an aircraft 14 that has one or more ejection seats 16 positioned within a cockpit 18, in accordance with an embodiment of the present invention. The rescue radio system of the present invention includes a rescue radio 10, which is carried by an aircrew member 20, and a transceiver or transceiver-like device, which is preferably a passive radio frequency tag 12 that is mounted within the cockpit 18 of the aircraft 14. More specifically, the tag 12 is preferably enclosed within a plastic member (not shown) that is positioned in the cockpit 18 and bolted to the aircraft 14. The tag 12 can be mounted anywhere in the cockpit 18, so long as the tag will not interfere with ejection of the ejection seat 16. The aircrew member 20 preferably turns on the rescue radio 10 outside of the aircraft and leaves the rescue radio on while getting into and out of the aircraft 14, and while within the aircraft.

Disregarding the rescue radio 10 and the tag 12, the aircraft 14 and the components thereof are conventional. While the aircraft 14 is operated, the aircrew member 20 is strapped to the ejection seat 16 by seatbelts, or the like. The rescue radio 10 is preferably securely and removably attached to the aircrew member 20, such as by being contained in a pocket of a vest that is worn by the aircrew member 20, or the like. The aircrew member 20 is preferably releasably enclosed within the cockpit 18 by a canopy 22. Whereas only a single assembly of an ejection seat 16, aircrew member 20 and rescue radio 10 are illustrated in FIG. 1, it is within the scope of the present invention for the cockpit 18 to include multiple of those assemblies. A single tag 12 can be used with multiple of those assemblies, as will be discussed in greater detail below. Alternatively, a separate tag 12 may be used for each of those assemblies.

In certain emergencies that render the aircraft 14 inoperative, the canopy 22 and the ejection seat 16 are operated in a conventional manner. That is, the canopy 22 is opened and the ejection seat 16, with the aircrew member 20 strapped thereto, is ejected from the cockpit 18. An arrow 24 indicates the initial trajectory of the ejection seat 16. As will be discussed in greater detail below, the rescue radio 10 senses accelerations that may be indicative of an ejection, and in response thereto the rescue radio 10 interrogates the tag 12 to determine if the rescue radio is within the cockpit 18. If it is determined through the interrogation that the rescue radio 10 is in the cockpit 18, then the rescue radio does not transmit a beacon signal. If it is determined through the interrogation that the rescue radio 10 is no longer in the cockpit 18, then the rescue radio transmits the beacon signal.

In accordance with the present invention, the rescue radio 10 transmits the beacon signal and remains connected or strapped to the aircrew member 20 throughout the entire process of the aircrew member being ejected from the cockpit 18 and parachuting to the ground. Thereafter, the aircrew member 20 may hold the rescue radio 10 in their hand and operate the rescue radio 10 in the same manner that a conventional primary handheld rescue radio (which is discussed in the Background of the Invention section of this disclosure) is operated. That is, once the aircrew member 20 reaches the ground, the rescue radio 10 will continue to transmit the beacon signal, unless that feature is deactivated by the aircrew member. Further, the rescue radio 10 is operative such that it can be used for facilitating two-way verbal communications. The beacon signal is like conventional beacon signals and can be characterized as providing both an indication that the ejection has occurred and an indication of the position of the rescue radio 10.

Figure 2:
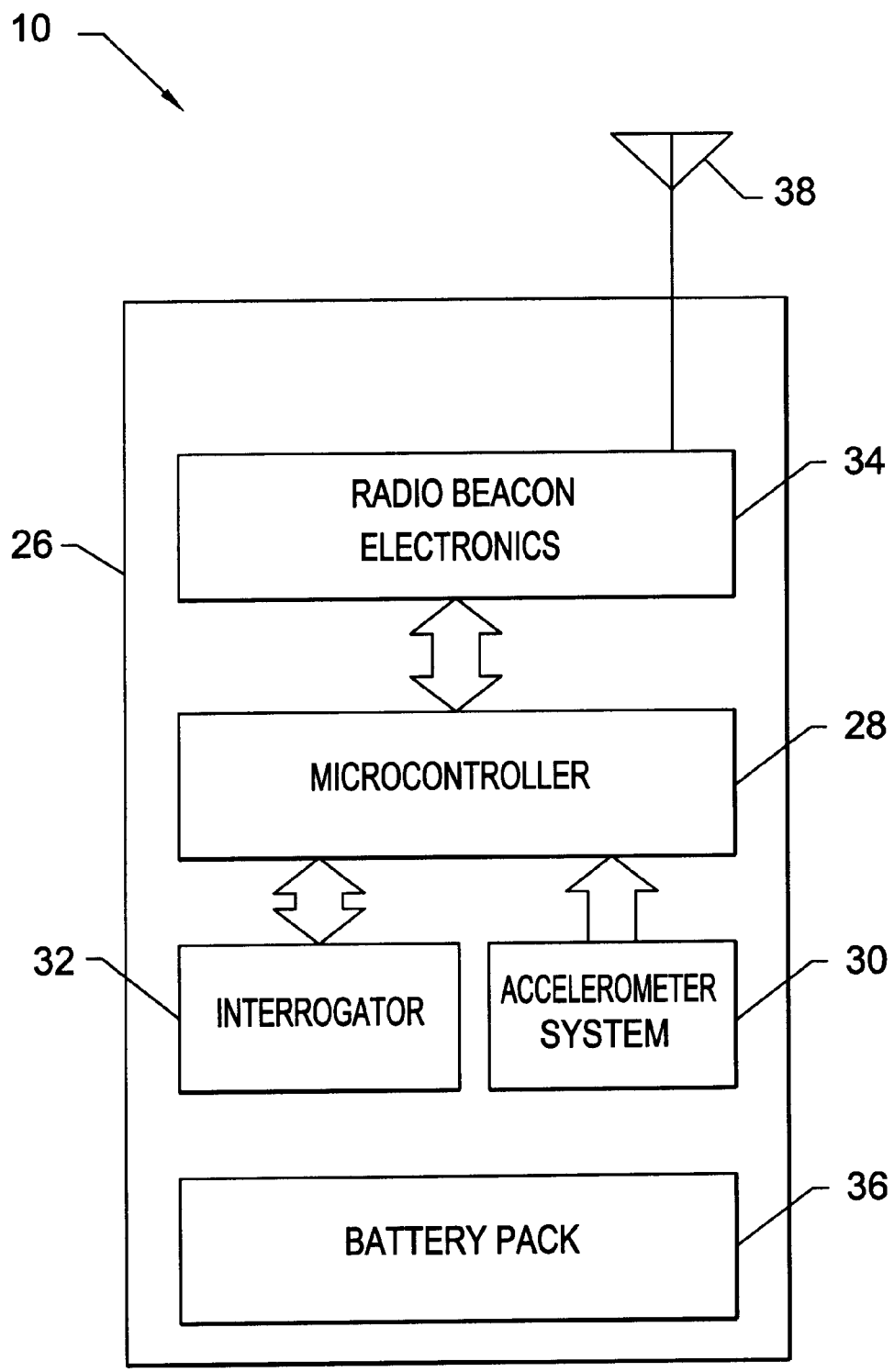
FIG. 2 is a diagrammatic illustration that shows some of the components of a rescue radio of the rescue radio system of FIG. 1, in accordance with an embodiment of the present invention.

FIG. 2 diagrammatically illustrates some of the components of the rescue radio 10, in accordance with an embodiment of the present invention. The function of the tag 12 (FIG. 1) and some of the components of the rescue radio 10 will be initially and briefly described primarily with reference to FIG. 2. A more detailed discussion of operations performed by the rescue radio 10 is presented below with reference to FIG. 4. As best understood with reference to FIG. 2, the rescue radio 10 includes a housing 26 that contains a majority of the components of the rescue radio 10. As will be discussed in greater detail below, a microcontroller 28 communicates with and controls the operation of some of the components of the rescue radio 10. For example, the microcontroller 28 receives an actuation signal from an accelerometer system 30. In response to receiving the actuation signal, the microcontroller 28 activates an interrogator 32 that operates in conjunction with the tag 12 (FIG. 1). The interrogator 32 transmits an interrogatory signal, and when the tag 12 is proximate to the interrogator 32 the tag receives the interrogatory signal and emits a reply signal that is received by the interrogator. The tag 12 and the interrogator 32 use only microamps of power, and the cockpit 18 is preferably shielded so that the interrogatory and reply signals that are generated within the cockpit are not substantially detectable outside the cockpit, such that those signals will not divulge the presence of the aircraft 14 to adversaries.

The interrogator 32 notifies the microcontroller 28 as to whether the interrogator receives the reply signal. In response to notification of the receipt of the reply signal (which is indicative of the rescue radio 10 and accompanying aircrew member 20 not having been ejected), the microcontroller 28 deactivates the interrogator 32 and does not activate a beacon transmitter 34, which is operative to transmit the beacon signal. In response to notification that the reply signal has not been received (which is indicative of the rescue radio 10 and accompanying aircrew member having been ejected), the microcontroller 28 deactivates the interrogator 32 and activates the beacon transmitter 34, so that the beacon signal is transmitted.

The rescue radio 10 further includes a battery pack 36, which supplies electrical power to components of the rescue radio in a conventional manner, and one or more antennas 38 for facilitating the transmission and reception of signals. The rescue radio 10 preferably further includes a conventional transceiver (not shown). That conventional transceiver is operative for transmitting and receiving audio signals so that the aircrew member 20 can verbally communicate with someone via the rescue radio in a conventional manner.

The microcontroller 28 can be any type of device for facilitating the herein described operations of the rescue radio system of the present invention. One acceptable example of a suitable microcontroller is a MC68HC912 microcontroller that is available from Motorola, which has facilities in Arizona. Similar microcontrollers are also suitable.

Many types of transmitters, receivers and transceivers can be used for the tag 12 (FIG. 1) and the interrogator 32. Such devices can employ infrared, acoustic, radio frequency, optical or magnetic means. In accordance with preferred embodiments of the present invention, radio frequency signals are used. Examples of tags 12 and interrogators 32 are disclosed in U.S. Pat. Nos. 4,087,802; 4,215,342; 5,289,163; 5,626,531; 5,686,902; 5,721,535; 5,734,326 and 5,808,550, all of which are incorporated herein by reference. More specifically, an acceptable example of an interrogator is a MICROstamp brand interrogator that is available from Micron Communications, which has facilities in Ohio. Similar interrogators are also suitable.

In accordance with one embodiment of the present invention, the tag 12 (FIG. 1) is a radio frequency tag and, more preferably, a passive radio frequency tag, such that it does not directly draw electrical power from a power source such as the battery 36. Radio frequency tags are commercially available and parameters associated therewith may be specified. Examples of the parameters that can be specified include the frequency of the interrogatory signals that activate the radio frequency tags, the frequency of the reply signals emitted from the radio frequency tags, reception sensitivities and emission ranges. In operation, the radio frequency tag 12 is activated in a known manner by receiving an interrogatory signal of the appropriate frequency. The received interrogatory signal powers the radio frequency tag 12 to cause it to emit the reply signal.

As best understood with reference to FIGS. 1 and 2, in accordance with the preferred embodiment of the present invention, the tag 12 and the interrogator 22 are selected so that (i) while the interrogator is within the cockpit 18 and transmits the interrogatory signal, the interrogator receives the reply signal emitted from the tag 12, and (ii) while the interrogator is outside of the cockpit and transmits the interrogatory signal, the interrogator does not substantially receive the reply signal from the tag. For example, in accordance with one example of an embodiment of the present invention, the interrogator 32 and the tag 12 are cooperative so that the interrogator receives the reply signal only while the rescue radio 10 is within approximately three to fifteen feet from the tag, or most preferably within approximately six feet from the tag. As a result, subsequent to the microcontroller 28 receiving the actuation signal from an accelerometer system 30, the rescue radio system operates differently depending upon whether the ejection seat 16 and its accompanying aircrew member 20 and rescue radio 10 have been ejected from the cockpit 18.

When the ejection seat 16 and its accompanying aircrew member 20 and rescue radio 10 have not been ejected from the cockpit 18 so that they are configured as shown in FIG. 1, the tag 12 receives the interrogatory signal, which has been transmitted from the interrogator 32 as described above, and the tag responsively emits the reply signal. The interrogator 32 receives the reply signal and the microcontroller 28 is notified of the receipt of the reply signal. ID response to notification of the receipt of the reply signal, the microcontroller 28 deactivates the interrogator 32 and does not activate a beacon transmitter 34, which is operative to transmit the beacon signal. That is, the beacon signal is not transmitted if the tag 12 and the interrogator 32 are within range of one another. As a result, the beacon signal is transmitted only when an actual ejection has occurred.

When the ejection seat 16 and its accompanying aircrew member 20 and rescue radio 10 have been ejected from the cockpit 18, the interrogator 32, which has transmitted the interrogatory signal as described above, does not receive the reply signal from the radio frequency tag 12. As a result, the microcontroller 28 deactivates the interrogator 32 and activates the beacon transmitter 34, so that the beacon signal is transmitted. That is, if the tag 12 and the interrogator 32 are out of range of one another, ejection has occurred and the beacon signal is transmitted.

Figure 3:
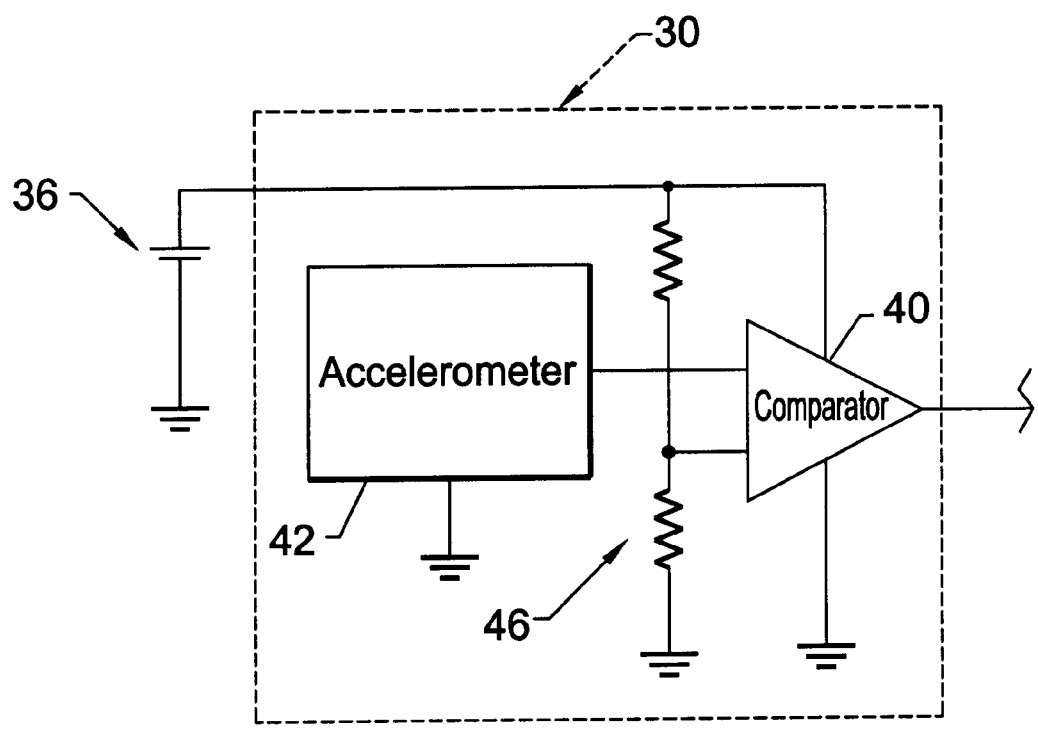
FIG. 3 is an electrical schematic that primarily illustrates components of an accelerometer system of the rescue radio of FIG. 2, in accordance with an embodiment of the present invention.

As best seen in FIG. 3, the accelerometer system 30 includes a conventional comparator 40 that is powered by the battery 36 (also see FIG. 2) or another suitable power supply. The comparator 40 receives inputs from an accelerometer 42 and a resister 46, and the comparator 40 outputs the actuation signal to the microcontroller 28 (FIG. 2). As will be appreciated by those skilled in the art, the accelerometer 42 has at least one sensitive axis. In accordance with an embodiment of the present invention, and as best understood with reference to FIG. 1, the rescue radio 10 is carried by the aircrew member 20 within the cockpit 18 so that the sensitive axis of the accelerometer 42 is approximately parallel to the initial trajectory of the ejection seat 16, which is represented by the arrow 24.

As best understood with reference to FIG. 3, the accelerometer 42 provides a voltage signal to the comparator 40, and that voltage signal is proportional to the acceleration experienced by the rescue radio 10 (FIGS. 1 and 2). The accelerometer system 30 draws only a few microamps while experiencing small accelerations. When a larger acceleration occurs along the sensitive axis of the accelerometer 42, the accelerometer generates a proportional voltage which trips the comparator 40 so that the comparator provides the actuation signal to the microcontroller 28, which activates or "wakes up" the microcontroller.

More specifically, the comparator 40 compares the voltage signal provided thereto from the accelerometer 42 to a predetermined voltage value that is defined by the resister 46. The appropriate resister 46 is selected during the designing of the rescue radio 10 (FIG. 1) so that the predetermined voltage value is preferably proportional to the minimum amount of acceleration that the rescue radio 10 can experience while the radio is being carried by an aircrew member 20 (FIG. 1) that is ejected from the aircraft 14 (FIG. 1) via the ejection seat 16 (FIG. 1). In accordance with one embodiment of the present invention, the predetermined voltage value may be proportional to approximately six times the earth's gravitational force. The predetermined voltage value may vary depending upon the type of aircraft 14 (FIG. 1) and the type of ejection seat 16 (FIG. 1) with which the rescue radio system is used.

The accelerometer 42 is preferably a piezoelectric accelerometer that generates a voltage proportional to the acceleration level without drawing any power from the battery 36. Alternatively, the accelerometer 42 can be of a type that draws power from the battery 36.

Figure 4:
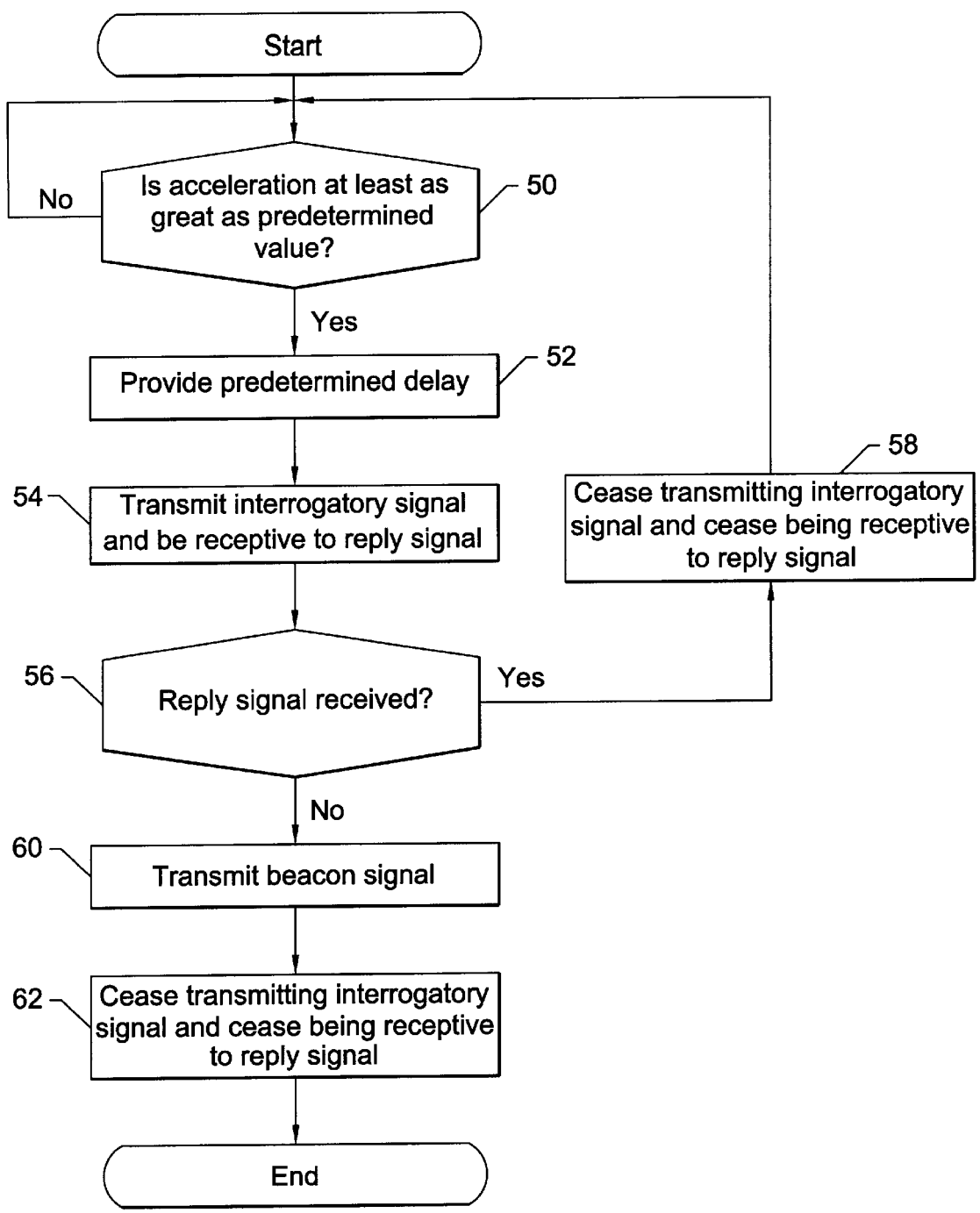
FIG. 4 is a block representation of operations performed by the rescue radio of FIG. 2, in accordance with an embodiment of the present invention.

With reference now to FIG. 4, operation of the rescue radio 10 (FIGS. 1 and 2) of the present invention will be described, in accordance with an embodiment of the present invention. In this regard, operations described with reference to FIG. 4 are controlled by the microcontroller 28 (FIG. 2), except for operations that are controlled by other components as described herein or as understood by those skilled in the art.

At block 50, a determination is made by the accelerometer system 30 (FIGS. 2 and 3) as to whether the rescue radio 10 (FIG. 1) has been accelerated at a rate that is at least as great as a predetermined value. More particularly, at block 50 a determination is made as to whether the accelerometer 42 has sensed an acceleration that exceeds the predetermined value that is specified by the setting of the resister 46 (FIG. 3). If a negative determination is made at block 50, control remains at block 50 and the microcontroller 28 (FIG. 2) and interrogator 32 (FIG. 2) can be characterized as remaining in an inactive or "sleep mode." If a positive determination is made at block 50, control is transferred to block 52. More particularly, if a positive determination is made at block 50, the accelerometer system 30 transmits the actuation signal, which can be characterized as a "wake-up interrupt," to the microcontroller 28 so that the microcontroller is activated.

At block 52, a predetermined time delay is allowed to lapse, and thereafter control is transferred to step 54. More specifically, at block 52 the microcontroller 28 (FIG. 2) provides for the passage of a predetermined delay in time that is at least as great as the amount of time that is required for the ejection seat 16 (FIG. 1) to be fully ejected from the cockpit 18 (FIG. 1). It is preferable for the predetermined delay in time to be no longer than is required for the ejection seat 16 to be fully ejected, so that the beacon signal, which is discussed with respect to block 60, can be transmitted from the highest possible elevation. For example, in accordance with one embodiment of the present invention the predetermined delay in time is approximately 0.5 seconds, which is enough time for a 6-G ejection 16 seat to get the aircrew member over approximately 22 feet away from the cockpit 18.

At block 54, the microcontroller 28 (FIG. 2) activates the interrogator 32 (FIG. 2) so that the interrogator transmits the interrogatory signal and is operative for receiving the reply signal. As mentioned above, the reply signal is emitted from the tag 12 (FIG. 1) when the tag is in the presence of the interrogatory signal.

At block 56 the interrogator 32 (FIG. 2) notifies the microcontroller 28 (FIG. 2) as to whether the reply signal is received by the interrogator. More particularly, the microcontroller 28 may query the interrogator 32 to determine whether the reply signal is received by the interrogator. In response to a positive determination at block 56, which will be the result if the rescue radio 10 (FIGS. 1 and 2) is within the cockpit 18 (FIG. 1) as described above, control is transferred to block 58. In response to a negative determination at the block 56, which will be the result if the rescue radio 10 has been ejected from the cockpit 18 as described above, control is transferred to block 60.

At block 60, the microcontroller 28 (FIG. 2) activates the beacon transmitter 34 (FIG. 2) so that the beacon signal is transmitted. Transmission of the beacon signal continues until the rescue radio 10 (FIGS. 1 and 2) is manually deactivated or the battery pack 36 (FIG. 2) is exhausted of electrical power.

At blocks 58 and 62, the microcontroller 28 (FIG. 2) deactivates the interrogator 32 (FIG. 2) so that the interrogator ceases transmitting the interrogatory signal and also ceases being receptive to the reply signal. The microcontroller 28 is also deactivated, such that the microcontroller and the interrogator 32 can both be characterized as being in an inactive or "sleep mode."

As should be apparent from the foregoing, the rescue radio system of the present invention advantageously coordinates the operations of the tag 12 (FIG. 1), accelerometer system 30 (FIGS. 2 and 3) and interrogator 32 (FIG. 2) such that the beacon signal is automatically transmitted only when the rescue radio 10 (FIGS. 1 and 2) has been ejected from the cockpit 18 (FIG. 1). In accordance with one embodiment of the present invention, the rescue radio system of the present invention is used in place of a primary handheld rescue radio, which is discussed in the Background of the Invention section of this disclosure. Because the rescue radio system of the present invention automatically provides the beacon signal when the rescue radio 10 is ejected from the cockpit 18, it is not necessary to equip the ejection seat 16 (FIG. 1) of the aircraft 14 (FIG. 1) with an emergency locater transmitter (ELT), which is a type of rescue radio that is discussed in the Background of the Invention section of this disclosure. Therefore, the present invention advantageously provides for a reduction in the number of rescue radios that are required for each aircrew member 20 (FIG. 1).

The operations of the rescue radio 10 (FIGS. 1 and 2) discussed with reference to FIG. 4 are preferably directed to the operations of a single rescue radio 10 and its corresponding tag 12 (FIG. 1). When multiple rescue radios 10 operate in conjunction with a single tag 12, it is preferred for the operations of the multiple rescue radios to be coordinatated, such as by each of the multiple rescue radios performing a "random time delay operation." As a result of the random time delay operation, a rescue radio 10 waits a short and random period of time immediately before performing the operations of block 54 (FIG. 4). Further, each rescue radio 10 only briefly transmits the interrogatory signal. For each of the multiple rescue radios 10, if a reply is received at block 56, it is preferred for the operations of the random time delay operation, block 54, and block 56 to be completed in a loop-like series for a predetermined number of times. If at any of the passes through the loop-like series a reply signal is not received at the block 56, control is transferred to the block 60 and the loop-like series is terminated. On the other hand, if a reply signal is received during the last pass through the loop-like series, control is transferred from the block 56 to the block 58. The predetermined number of times that the loop-like series is repeated can be selected so that the probability of the operations of any number of the multiple rescue radios 10 interfering with one another is insignificant.

In accordance with an alternative embodiment in which multiple rescue radios 10 (FIGS. 1 and 2) operate in conjunction with a single tag 12 (FIG. 1), each of the multiple rescue radios is equipped with a receiver that detects the interrogatory signals of the other of the multiple rescue radios. For example, when one of the multiple rescue radios 10 receives the interrogatory signal of another of the rescue radios, the rescue radio receiving the interrogatory signal does not transmit an interrogatory signal, but is receptive to the reply signal that may or may not be emitted by the tag 12 (FIG. 1) and operates with respect to that reply signal as described above with reference to block 56 (FIG. 4).

Notwithstanding that the present invention advantageously provides for a reduction in the number of rescue radios that are required for each aircrew member, the rescue radio 10 (FIGS. 1 and 2) of the present invention can be used in conjunction with an ELT that is mounted to the ejection seat 16 (FIG. 1), to advantageously provide redundancy in the automatic transmission of beacon signals.

In accordance with the present invention, consumption of electrical energy is advantageously minimized since the microcontroller 28 (FIG. 2) and the interrogator 32 (FIG. 2) are activated only when the rescue radio 10 (FIGS. 1 and 2) has experienced an acceleration that may be indicative of an ejection. Further, the accelerometer system 30 (FIGS. 2 and 3) draws only a few microamps while waiting for large accelerations, and the radio frequency tag 12 (FIG. 1) is preferably passive such that it is not directly powered by a source of electrical energy. As a result, the rescue radio system of the present invention consumes a minimal amount of electrical energy, which is advantageous.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terns are employed herein, they are used in a generic and descriptive sense only and not for purposes of limitation.

What is claimed:

1. A radio system that automatically activates a beacon in response to an aircrew member being ejected from an aircraft via an ejection seat, the radio system comprising:

a transceiver for being carried by and remaining with the aircraft, wherein the transceiver is operative to emit a reply signal in response to an interrogatory signal; and a radio for being carried by the aircrew member and comprising:

an accelerometer system operative for generating an actuation signal in response to the radio being accelerated at a rate that is at least as great as a predetermined acceleration value, an interrogator that is operative for transmitting the interrogatory signal and further operative for receiving the reply signal only when the radio is proximate to the transceiver, a beacon transmitter that is operative for transmitting a beacon signal, and a controller that is operative to:

cause the beacon transmitter to transmit the beacon signal in response to the accelerometer system generating the actuation signal if the interrogator substantially fails to receive the reply signal, whereby the beacon signal is transmitted when the radio has been ejected from the aircraft, and prevent the beacon transmitter from transmitting the beacon signal in response to the accelerometer system generating the actuation signal if the interrogator substantially receives the reply signal, whereby no beacon signal is transmitted when the radio is still within the cockpit.

2. A radio system according to claim 1, where the transceiver comprises a radio frequency tag.

3. A radio system according to claim 1, wherein the controller is further operative to activate the interrogator, so that the interrogator transmits the interrogatory signal, in response to the actuation signal being generated by the accelerometer system.

4. A radio system according to claim 1, wherein the predetermined acceleration value is at least as small as the minimum amount of acceleration that the radio experiences while the radio is being carried by an aircrew member who is ejected from the aircraft via the ejection seat.

5. A radio system according to claim 1, wherein the controller is further operative to cause the interrogator to transmit the interrogatory signal at a predetermined time after the actuation signal is generated by the accelerometer system, wherein the predetermined time is at least as great as the amount of time which it takes for the ejection seat to be ejected from the aircraft.

6. A radio system according to claim 1, wherein the interrogator and the transceiver are cooperative so that the interrogator receives the reply signal only while the radio is within approximately six feet from the transceiver.

7. A combination of a transportation and communication system for an aircrew member, the combination comprising:

an aircraft comprising:
- a cockpit for receiving the aircrew member,
- an ejection seat within the cockpit, wherein the ejection seat is operative for having the aircrew member strapped thereto, and the ejection seat is further operative for being ejected from the cockpit with the aircrew member, and
- a transceiver mounted to the aircraft and operative to emit a reply signal in response to an interrogatory signal; and a radio that is carried by the aircrew member and is operative to be automatically activated in response to the aircrew member being ejected from the aircraft via the ejection seat, the radio comprising:
- an accelerometer system that is operative for generating an actuation signal in response to the radio being accelerated at a rate that is at least as great as a predetermined acceleration value,
- an interrogator that is operative for transmitting the interrogatory signal and further operative for receiving the reply signal only when the radio is proximate to the transceiver, and
- a beacon transmitter that:
  transmits a beacon signal in response to the accelerometer generating the actuation signal if the interrogator fails to substantially receive the reply signal, whereby the beacon signal is transmitted when the radio has been ejected from the aircraft, and
  refrains from transmitting the beacon signal in response to the accelerometer system generating the actuation signal if the interrogator substantially receives the reply signal, whereby no beacon signal is transmitted when the radio is still within the cockpit.

8. A combination of a transportation and communication system according to claim 7, wherein the transceiver device comprises a radio frequency tag that is mounted within the cockpit.

9. A combination of a transportation and communication system according to claim 8, wherein the interrogator and the transceiver are cooperative so that the interrogator substantially receives the reply signal only while the radio is within the cockpit.

10. A combination of a transportation and communication system according to claim 7, wherein the controller is further operative to activate the interrogator, so that the interrogator transmits the interrogatory signal, in response to the actuation signal being generated by the accelerometer system.

11. A combination of a transportation and communication system according to claim 7, wherein:
- the ejection seat has an initial trajectory when the ejection seat is ejected from the cockpit; and
- the accelerometer system comprises a sensitive axis, and the radio is carried by the aircrew member within the cockpit so that the sensitive axis is substantially parallel to the initial trajectory of the ejection seat.

12. A combination of a transportation and communication system according to claim 7, wherein the predetermined acceleration value is at least as small as the minimum amount of acceleration that the radio experiences while the radio is being carried by the aircrew member and the aircrew member is ejected from the cockpit via the ejection seat.

13. A combination of a transportation and communication system according to claim 7, wherein the controller is further operative to cause the interrogator to transmit the interrogatory signal at a predetermined time after the actuation signal is generated by the accelerometer system, wherein the predetermined time is at least as great as the amount of time which it takes for the ejection seat to be ejected from the cockpit.

14. A method for identifying movement of an object away from a location, the method comprising:
- determining whether the object has accelerated;
- transmitting an interrogatory signal from the object in response to determining that the object has accelerated;
- determining if the object is in the location, the determining step comprising the step of determining if a reply signal from the location is received at the object in response to the interrogatory signal; and
- transmitting a beacon if the interrogatory signal has been transmitted and substantially no reply signal is received at the object.

15. A method according to claim 14, wherein transmitting the beacon comprises transmitting the beacon so that the beacon is indicative of the departure of the object from the location.

16. A method according to claim 14, wherein transmitting the beacon comprises transmitting the beacon so that the beacon is indicative of the position of the object.

17. A method according to claim 14, further comprising delaying a predetermined period of time between determining whether the object has accelerated and determining if the reply signal is received at the object.

18. A method according to claim 14, further comprising providing the reply signal, wherein providing the reply signal comprises placing a radio frequency tag at the location, wherein the radio frequency tag emits the reply signal in response to receiving the interrogatory signal.

19. A method according to claim 14, wherein:
- determining whether the object has accelerated comprises:
  measuring the acceleration of the object, and determining if the measured acceleration is at least as large as a predetermined value; and
- transmitting the interrogatory signal is responsive to a positive determination that the measured acceleration is at least as large as the predetermined value.

* * * * *